US010536565B2

United States Patent
Bachar et al.

(10) Patent No.: US 10,536,565 B2
(45) Date of Patent: Jan. 14, 2020

(54) EFFICIENT CENTRALIZED STREAM INITIATION AND RETRY CONTROL

(71) Applicant: INTERNATIONAL BUSINESS MACHINES CORPORATION, Armonk, NY (US)

(72) Inventors: Yariv Bachar, Kibbutz Ma'abarot (IL); Ron Edelstein, Tel Aviv (IL); Alon Horowitz, Tel Aviv (IL); Oded Sonin, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 13/828,602

(22) Filed: Mar. 14, 2013

(65) Prior Publication Data

US 2014/0280824 A1 Sep. 18, 2014

(51) Int. Cl.
*G06F 15/173* (2006.01)
*H04L 29/14* (2006.01)
*H04L 29/08* (2006.01)

(52) U.S. Cl.
CPC .......... *H04L 69/40* (2013.01); *H04L 67/1097* (2013.01); *H04L 67/325* (2013.01)

(58) Field of Classification Search
CPC ....... H04W 28/00; H04W 4/00; H04W 16/00; H04J 1/16; G06F 13/00; G06F 12/00; H04L 67/40; H04L 67/325; H04L 67/1097
See application file for complete search history.

(56) References Cited

U.S. PATENT DOCUMENTS

| | | | | |
|---|---|---|---|---|
| 5,603,058 A | * | 2/1997 | Belknap | G06F 3/0601 360/39 |
| 5,699,515 A | * | 12/1997 | Berkema et al. | 370/448 |
| 6,078,568 A | * | 6/2000 | Wright et al. | 370/312 |
| 6,819,676 B1 | * | 11/2004 | Min | H04L 12/413 370/445 |
| 2001/0012270 A1 | * | 8/2001 | Godoroja | G06F 21/606 370/230 |
| 2004/0243900 A1 | * | 12/2004 | Henkel | G06F 13/1605 714/742 |
| 2004/0267916 A1 | * | 12/2004 | Chambliss | H04L 41/0893 709/223 |
| 2006/0259818 A1 | * | 11/2006 | Howell | G06F 11/1484 714/21 |
| 2008/0101597 A1 | * | 5/2008 | Nolan et al. | 380/30 |
| 2008/0279210 A1 | * | 11/2008 | Naka | H04W 28/18 370/448 |
| 2009/0028186 A1 | * | 1/2009 | Schmidt | H04L 12/2838 370/468 |
| 2009/0116397 A1 | * | 5/2009 | Denby et al. | 370/252 |

(Continued)

*Primary Examiner* — Oleg Survillo
*Assistant Examiner* — Jihad K Boustany
(74) *Attorney, Agent, or Firm* — Griffiths & Seaton PLLC (57) ABSTRACT

For efficient centralized stream initiation and retry control in a computing environment, using a centralized data streams management module for both managing when data streams should be opened and sent from a source location to a destination and for determining when to reattempt opening data streams sent from the source location to the destination after an nth number of consecutive failed attempts using an incrementing time calculation. The incrementing time calculation computes a dynamically calculated time period.

24 Claims, 4 Drawing Sheets

(56) References Cited

U.S. PATENT DOCUMENTS

| | | | |
|---|---|---|---|
| 2010/0153634 A1* | 6/2010 | Fellinger | G06F 3/0611 |
| | | | 711/104 |
| 2011/0060957 A1* | 3/2011 | Bogucharov | G06F 11/1443 |
| | | | 714/749 |
| 2012/0066447 A1* | 3/2012 | Colgrove | G06F 3/061 |
| | | | 711/114 |
| 2012/0182867 A1* | 7/2012 | Farrag | H04W 28/0236 |
| | | | 370/230 |
| 2013/0028103 A1* | 1/2013 | Hui | H04W 74/0808 |
| | | | 370/252 |
| 2014/0215081 A1* | 7/2014 | Cili et al. | 709/227 |

* cited by examiner

EFFICIENT CENTRALIZED STREAM INITIATION AND RETRY CONTROL

BACKGROUND OF THE INVENTION

Field of the Invention

The present invention relates in general to computers, and more particularly to efficient centralized stream initiation and retry control in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Computing systems may also be in a computing network that form a collection of computers and other hardware interconnected by communication channels that allow for sharing of resources and information. Customer data, or data generated by users within a data processing system, occupies a great portion of this data storage. Many of these computer systems include virtual storage components. One of the many challenges of these computing system is storing, placing, transferring, sending, and arranging data in such a way that allows for quick and timely access to the data while reducing the consumption of valuable computing resources.

SUMMARY OF THE DESCRIBED EMBODIMENTS

In one embodiment, a method is provided for efficient centralized stream initiation and retry control using a processor device in a computing environment. In one embodiment, by way of example only, the method uses a centralized data streams management module for both managing when data streams should be opened and sent from a source location to a destination and for determining when to reattempt opening data streams sent from the source location to the destination after an nth number of consecutive failed attempts using an incrementing time calculation. The incrementing time calculation computes a dynamically calculated time period.

In another embodiment, a computer system is provided for efficient centralized stream initiation and retry control in a computing environment. The computer system includes a computer-readable medium and a processor in operable communication with the computer-readable medium. In one embodiment, by way of example only, the processor uses a centralized data streams management module for both managing when data streams should be opened and sent from a source location to a destination and for determining when to reattempt opening data streams sent from the source location to the destination after an nth number of consecutive failed attempts using an incrementing time calculation. The incrementing time calculation computes a dynamically calculated time period.

In a further embodiment, a computer program product is provided for efficient centralized stream initiation and retry control in a computing environment. The computer-readable storage medium has computer-readable program code portions stored thereon. The computer-readable program code portions include a first executable portion that uses a centralized data streams management module for both managing when data streams should be opened and sent from a source location to a destination and for determining when to reattempt opening data streams sent from the source location to the destination after an nth number of consecutive failed attempts using an incrementing time calculation. The incrementing time calculation computes a dynamically calculated time period.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, computing systems are used to store and manage a variety of types of data and/or files. The computing systems may also be in a computing network that form a collection of computers and other hardware interconnected by communication channels that allow for sharing of resources and information. Customer data, or data generated by users within the data processing system, occupies a great portion of this data storage. One of the many challenges of these computing system is storing, placing, transferring, sending, and arranging data in such a way that allows for quick and timely access to the data while reducing the consumption of valuable resources.

In one embodiment of a computer networking, a data stream may represent a sequence of data transferred from a source to a destination. Multiple streams are used simultaneously when transferring data in order to increase throughput. Since each stream is independent from other streams, the streams may be managed asynchronously on different threads or processes without any centralized module to manage them. Therefore, a source location may be able to initiate more streams than the destination's capacity allows and/or permits. In addition, the destination's capacity may change during the transfer of the data, such as when another source location starts an additional transfer to the destination. As a result, the maximum possible number of open streams at a given time changes periodically. Moreover, a futile attempt to open a stream to a busy destination entails overhead. Therefore, a need exists to maximize the number of open streams at any given time while minimizing the number of rejections caused by failed attempts to open additional streams.

The present invention address such needs by providing a solution for efficient centralized stream initiation and retry control in a computing environment. In one embodiment, the present invention uses a centralized data streams management module for both managing when data streams should be opened and sent from a source location to a destination, and also uses the centralized data streams management module for determining when to reattempt opening data streams sent from the source location to the destination after an nth number of consecutive failed attempts using an incrementing time calculation. The centralized data streams management module means there is a centralized management module that streams the data. The incrementing time calculation computes a dynamically calculated time period. The centralized data streams management module centralizes, coordinates, and manages all threads desiring to open new and/or additional data streams. Such centralization and management operations eliminates each thread working independently and trying to open new streams. In one embodiment, a stream is a sequence of data. When opening a stream from a source to a destination, a thread is sending the sequence of data from the source to the destination. The thread doesn't use the centralized data streams management module to send the stream (the sequence of data), but rather uses the centralized data streams management module to determine when to do so. Since the centralized data streams management module decides when each thread tries to open the thread's stream (in contrast to the current start of the are, where each thread decides by itself when to do so), this allows the centralized data streams management module to calculate the best timing and coordinate the threads accordingly. In the current state of the art, there is no coordination between the threads, and each thread works independently and tries to open a stream without taking into account the fact that some other thread might already tried to open its own stream and failed. In contrast, the present invention uses a centralized data streams management module to coordinate between the threads, thus if one thread was rejected the centralized data streams management module uses that information and will not let another thread try opening data streams sent from the source location to the destination again for a certain amount of time (e.g., the dynamically calculated time period) since it will probably fail as well. Thus, the centralized data streams management module provides for centralized streaming initiations and eliminates each stream remaining independent from other streams. Also, by using the centralized data streams management module for coordinating between each of the threads, the centralized data streams management module uses information relating to the failed attempts for calculating the dynamically calculated time period, rather than deriving a wait time for each thread solely from information regarding the independent stream itself. The present invention also reduces the number of rejections by requiring a predetermined wait period after each rejection.

In one embodiment, the centralized stream module is located at the source location and is responsible for deciding when and in which rate to open new and/or additional streams to the destination. Instead of letting each thread check whether the destination is busy, the centralized stream module selects only one thread at a time to check whether the destination is available for opening new and/or additional streams. If the thread reports to the centralized stream module that the destination is available, the centralized stream module immediately triggers the next thread for opening new and/or additional streams. However, if the thread reports to the centralized data streams management module that the destination is unavailable and/or busy and cannot serve the sender, the centralized stream module waits a dynamically calculated time period before triggering a thread to check the destination again for determining if the destination is available for sending a new and/or additional stream. After the time period elapses, the centralized data streams management module triggers some other waiting thread and/or a next waiting thread and not necessarily the initial thread that tried the destination. The centralized data streams management module may pick the initial thread again if the initial thread decides to try again and then potentially wait/sleep with the other waiting threads. This depends on the implementation of the way a waiting thread is selected, which may vary according to implementation, (e.g., such as a random selection, selection based on a weighted value, a round robin, etc.). The dynamically calculated time period increases according to an incrementing time calculation operation after each failed attempt of determining that the destination is available (e.g., the failed attempt means that the destination is determined to be busy and/or unavailable).

For example, in one embodiment, if a thread checks to see if the destination is available and the destination is in fact available, the centralized data streams management module triggers a new thread to open a new and/or additional stream. If the destination accepted a new stream, the centralized data streams management module checks whether the destination will accept additional streams. In one embodiment, the thread first opens the new stream the thread originally intended, then the centralized data streams management module signals a waiting and/or sleeping thread to try opening an additional stream. Also, the thread leaves the module completely and starts working on the new stream the thread opened. A stream doesn't send itself to the destination; a stream is always assigned to some thread. This is the reason that the thread doesn't try to open several streams, and the thread tries to open and send its own stream, and on the way, the centralized data streams management module signals some waiting thread to attempt to open a data stream sent from the source location to the destination as well since the destination will probably accept it.

In one embodiment, by triggering only one thread at a time and by increasing the dynamically calculated time period/interval with each consecutive failed attempt of determining that the destination is available, the number of rejections is reduced thereby lowering the computing resource overhead. This is because the number of threads doesn't change and the overhead associated with threads doesn't change, but an attempt to open an additional stream by some thread to the destination and to check whether the destination is available in the process costs time and resources. Thus a futile attempt to open a stream from a source to the destination has an overhead of time and resources. This overhead is thereby lowered by reducing the number of rejections of attempts to open a new and/or additional streams (e.g., futile attempts to open additional streams). Moreover, the centralized stream module triggers a next waiting thread (e.g., a subsequent thread that is in a sleep mode) immediately when the destination is reported to the centralized stream module as being available and/or not busy, thus reducing the time it takes to reach the maximum possible open streams.

Figure 1:
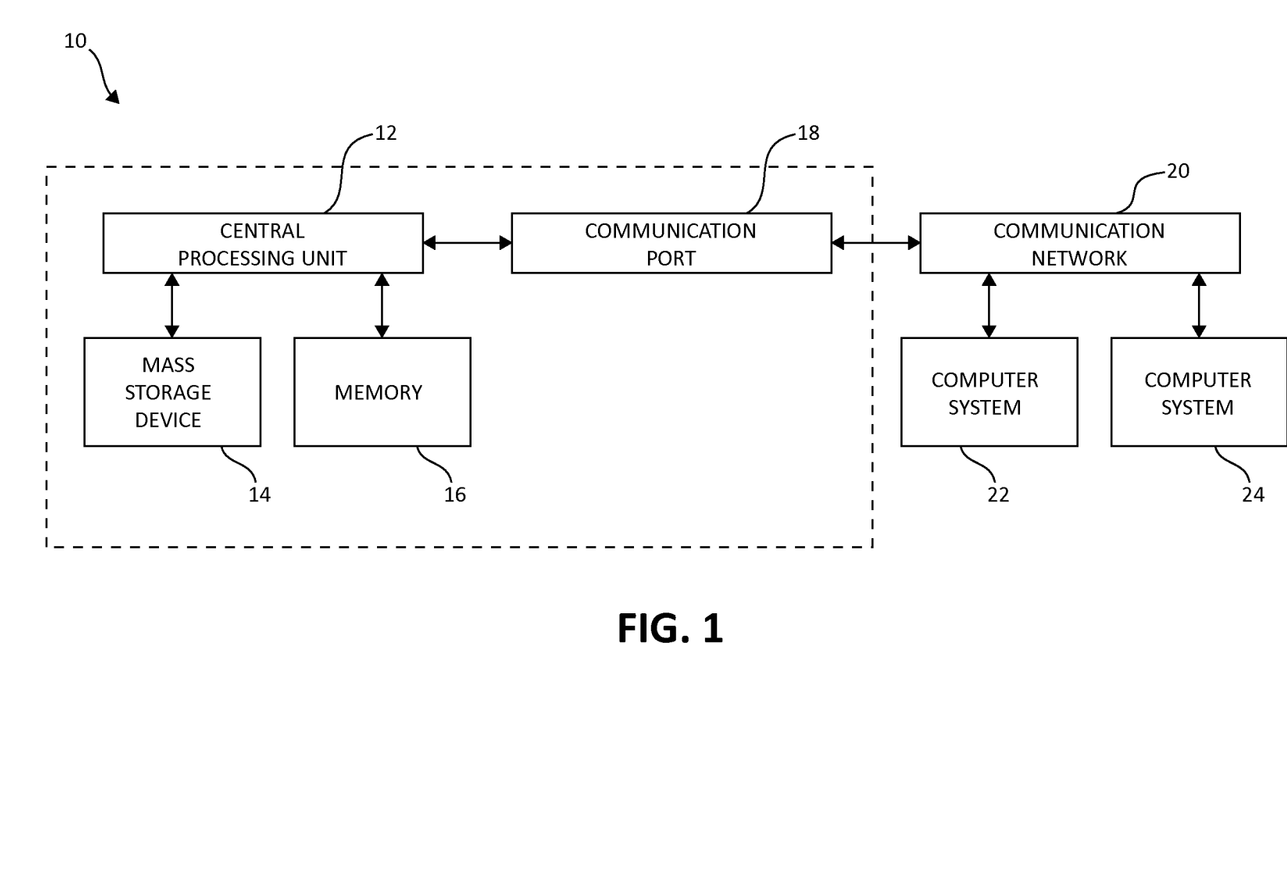
FIG. 1 is a block diagram illustrating a computer storage environment having an exemplary storage device in which aspects of the present invention may be realized.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
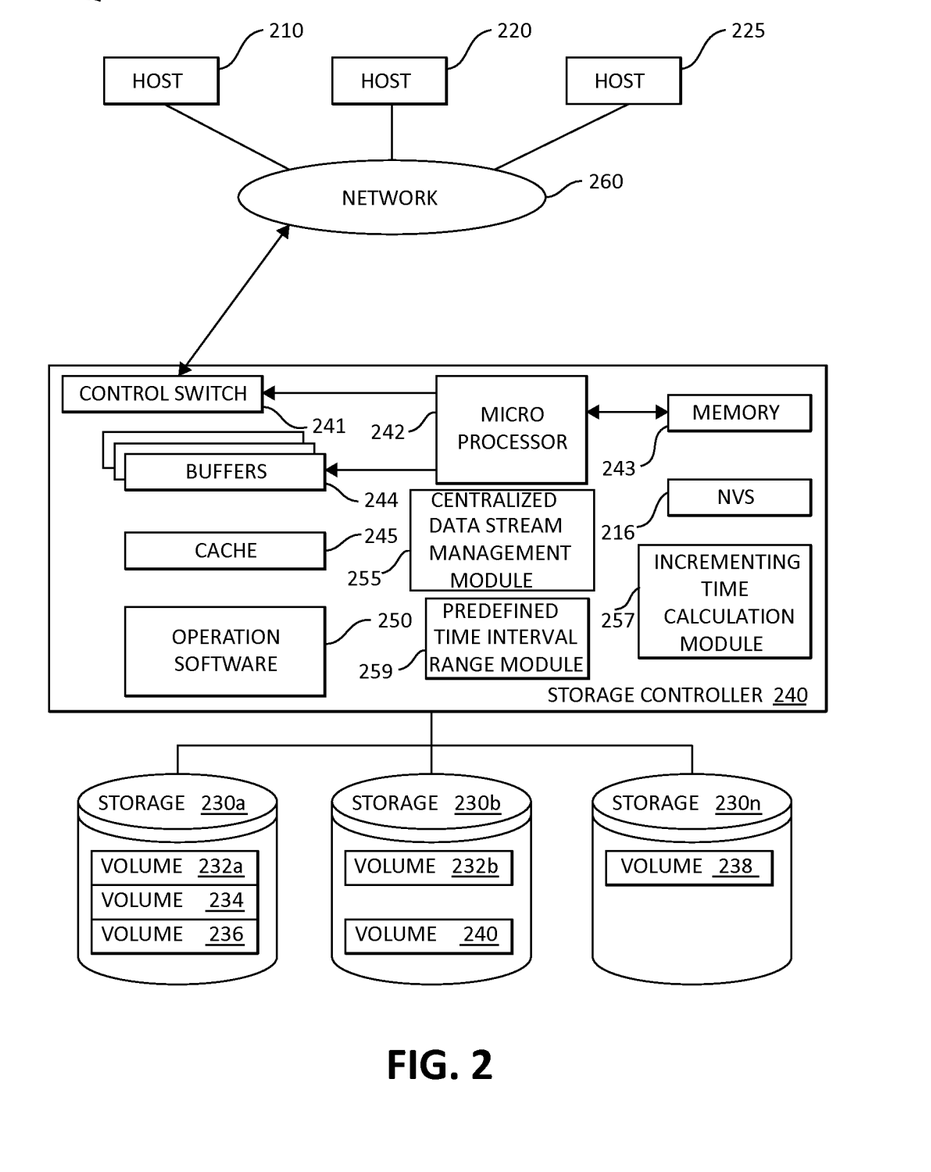
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a centralized data streams management module 255, an incrementing time calculation module 257, and a predefined time interval range module 259 in a computer storage environment. The centralized data streams management module 255, the incrementing time calculation module 257, and the predefined time interval range module 259 may work in conjunction with each and every component of the storage controller 240, the hosts 210, 220, 225, and storage devices 230. The centralized data streams management module 255, the incrementing time calculation module 257, and the predefined time interval range module 259 may be structurally one complete module working together and in conjunction with each other for performing such functionality as described below, or may be individual modules. The centralized data streams management module 255, the incrementing time calculation module 257, and the predefined time interval range module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the centralized data streams management module 255, the incrementing time calculation module 257, and the predefined time interval range module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the centralized data streams management module 255, the incrementing time calculation module 257, and the predefined time interval range module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

Figure 3:
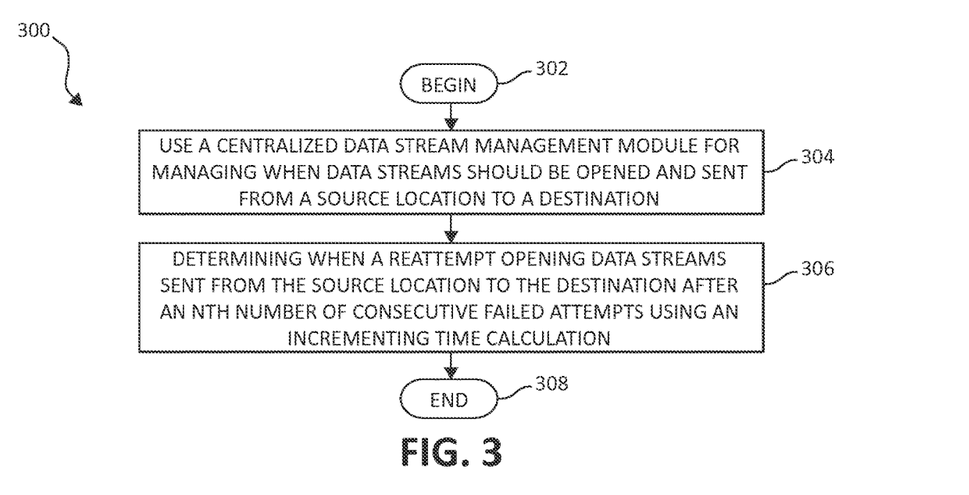
FIG. 3 is a flow chart diagram illustrating an exemplary method for efficient centralized stream initiation and retry control in which aspects of the present invention may be realized.
Figure 4:
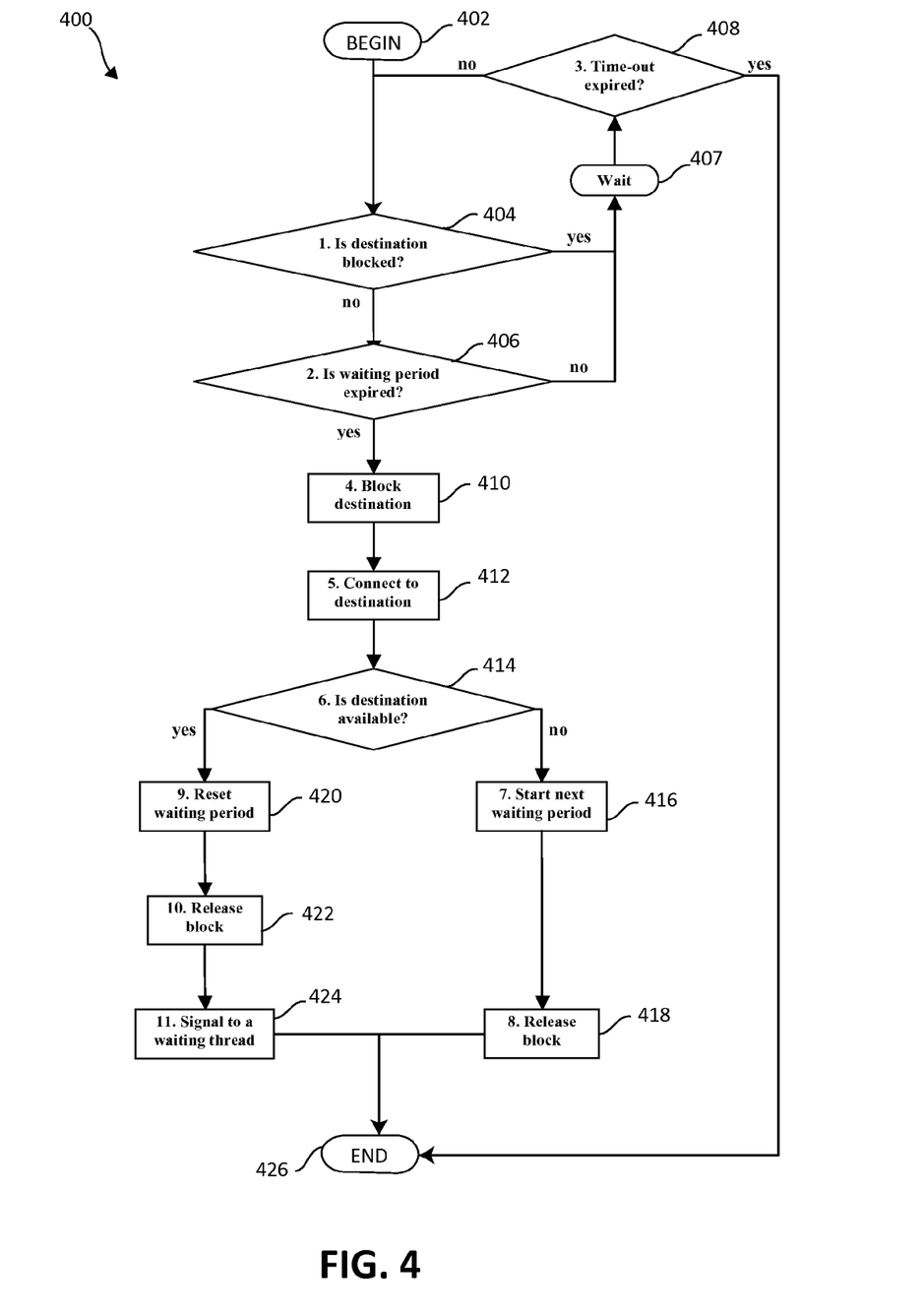
FIG. 4 is a flow chart diagram illustrating an exemplary alternative method for efficient centralized stream initiation and retry control in which aspects of the present invention may be realized.

Turning now to FIGS. 3 and 4, when a new thread wants to open a new and/or additional stream to the destination, the thread first consults with the centralized stream module described above. If the centralized stream module is not in the dynamically calculated time period or waiting for another thread to retrieve the destination status, the thread goes to sleep until either the centralized stream module signals the sleeping thread to wake up and/or a predefined sleep time period has elapsed. In other words, the thread goes to sleep if the module is waiting after a destination was found to be unavailable, busy, and/or or if the centralized data streams management module and/or thread is currently waiting for another thread to retrieve the status of the destination. It should be noted that destination may be unavailable and busy and not be able to receive an additional stream of data in a particular moment because, for instance, the destination might be busy with streams from other sources, thus the destination may not have any more resources to spare.

In one embodiment, when the centralized stream module notices threads waiting for the destination, the centralized stream module signals a single thread to wake up and the centralized stream module triggers the thread to try and open a new and/or additional stream. The centralized stream module waits until the thread reports back whether the destination is either available or unavailable (e.g., busy and/or not capable of accepting a new/additional stream). If the destination is available, the thread opens a new and/or additional stream to the destination and the centralized stream module signals another thread to wake up. This may be a next consecutive thread (which may include sleeping threads) that may be in a centralized stream module queue (or waiting at the source location) and/or the centralized stream module may randomly select a next thread. The policy by which the centralized stream module picks a next thread may be configured in several ways, according to the desired behavior. As such, a variety of selections options are available and the centralized stream module may be configured to implement a variety of thread selection capabilities based on the desired behavior for the thread selection. In the event that the destination is determined to be unavailable and/or busy, the centralized stream module waits a certain dynamically calculated time period that is dynamically calculated until the centralized stream module signals the thread to try the destination again for determining if the destination is available. For example, in one embodiment, a waiting and/or sleeping thread is randomly selected and the centralized data streams management module signals the waiting and/or sleeping thread to wake up try to connect to the destination. The selecting of the waiting and/or sleeping thread may be implemented using the queue, as mentioned above, if equity and fairness is desired for each thread to initiate opening a new and/or additional data stream using the centralized data stream module. Also, randomly selecting of the waiting and/or sleeping thread may be implemented using with weights (e.g., weighted values assigned to each thread). Thus, in one embodiment, the centralized data streams management module supports implementations that allow for selecting single waiting and/or sleeping thread.

In one embodiment, by way of example only, calculating the dynamically calculated time period may be as follows. On the first failed attempt for opening data streams sent from the source location to the destination (e.g., the destination is determined to be unavailable and/or busy), the dynamically calculated time period is randomly selected from a predefined range of time intervals. In other words, the predefined range of time intervals is predefined and the dynamically calculated time period randomly selected from the predefined range of time intervals. On each consecutive failed attempt (e.g., at least 1 or more attempts), a next dynamically calculated time period is calculated by increasing the previous dynamically calculated time period by a power of 2 (similar to binary exponential back-off), exponentially, and/or by a gradual incrementing calculation algorithm. The dynamically calculated time period keeps increasing with each consecutive failed attempt until reaching a predefined maximum predetermined wait time interval. In addition, after a predefined maximum dynamically calculated time period, the last nth number of consecutive failed attempts may be reset to zero. The dynamically calculated time period may then be randomly selected again, as mentioned above, which random selection is similar to the case of the first rejection. Also, the number of failed attempts may be reset to zero may be reset to zero if the destination is determined to be available and/or not busy (e.g., the destination is determined to be available after performing an nth number of attempts after a first failed attempt).

In one embodiment, starting with a short initial dynamically calculated time period and increasing the dynamically calculated time period after each consecutive failed attempt, the present invention ensures a quick response to temporary rejections and minimizes the number of failed attempts on continuous rejections (e.g., rejection of threads and/or streams). In addition, randomly selecting the initial dynamically calculated time period and resetting the number of failed attempts after a maximum dynamically calculated time period prevents starvation of one source by another source streaming to the same destination.

It should be noted, as described herein the initial waiting period (e.g., the dynamically calculated time period) is dynamically selected. The dynamically calculated time period is randomly selected from a predefined range (e.g., a predefined range of time intervals). The next waiting period (e.g., the next dynamically calculated time waiting period) after a consecutive failed attempt is dynamically calculated using some gradually incrementing calculation algorithm (e.g., the calculation algorithm is increasing the previous waiting period by a power of 2). The maximum waiting period (e.g., maximum dynamically calculated time period) is predefined. The number of consecutive failed attempt, after which the waiting period is reset, is also predefined. The amount of time a thread waits for some other thread to signal it before giving up is predefined.

FIG. 3 is a flow chart diagram illustrating an exemplary method 300 for efficient centralized stream initiation and retry control in which aspects of the present invention may be realized. The method 300 begins (step 302) by using a centralized data streams management module for managing when data streams should be opened and sent from a source location to a destination (step 304) and for determining when to reattempt opening data streams sent from the source location to the destination after an nth number of consecutive failed attempts using an incrementing time calculation (step 306). The incrementing time calculation computes a dynamically calculated time period. The method 300 ends (step 308).

FIG. 4 is a flow chart diagram illustrating an additional exemplary method 400 for efficient centralized stream initiation and retry control in which aspects of the present invention may be realized. The method 400 begins step 402. The method determines through the centralized data streams management module whether the destination is blocked (step 404). The destination will be blocked if some other thread as already entered and blocked the destination (step 410). If the destination is not blocked, the method 400 checks whether the module is during a waiting period (e.g., the dynamically calculated time waiting period) (step 406). This waiting period indicates that some other thread recently tried to connect to the destination and was rejected. If the destination is blocked or the centralized data streams management module is in the dynamically calculated time waiting period, the thread waits/goes to sleep until one of the following has occurred: option 1) some other thread that connected to the destination and succeeded to open a stream signals it to wake up (step 424), or option 2) a predefined time period has elapsed. This will fail the attempt to open a stream. When the thread wakes up, the method 400 checks which option woke up the thread (e.g., the time-out is now expired) (step 408) and if the reason was a time-out (option2), the method 400 quits without opening a new stream (step 426). If the destination is not blocked and the centralized data streams management module is not in a waiting period (e.g., the dynamically calculated time waiting period), the thread blocks the destination (step 410). This will ensure that at most one thread tries to connect to the destination at any given time. Then the thread connects to the destination (step 412) and then the method 400 checks whether the destination can accept an additional stream (step 414). If the destination is busy and/or unavailable, the thread tells the centralized data streams management module to start a next waiting period (e.g., an nth dynamically calculated time period) (step 416), releases the block on the destination (step 418) and quits without opening a new stream (step 426). If the destination is available, the thread instructs the centralized data streams management module to reset the nth number of consecutive failed attempts counter back to zero (0) (step 420), releases the block on the destination (step 422), and signals to a waiting thread to wake up (step 424) and quits after opening a new stream (step 426). It should be noted that the blocking condition that blocks the destination is defined in the centralized data stream module. The thread actually calls to a process/method in the centralized data stream module, which unblocks the destination. Signaling the next waiting thread is also a process, which is called by the thread. As such, the thread instructs the centralized data streams management module to reset the counter, to release the block, and to signal the next waiting thread. The first attempt to start the next waiting period, which might be the first failed attempt since the module started or the first failed attempt after the waiting period was reset (step 420), picks the initial waiting period (e.g., an initial dynamically calculated time waiting period) randomly from a predefined range (e.g., a predefined range of time intervals). Any consecutive failed attempt increases the initial waiting period according to some predefined logic (for example, on each consecutive failed the method 400 increases the waiting period by a power of 2). This maximum waiting period (e.g., a maximum dynamically calculated time waiting period) is capped by some predefined maximum waiting period. In addition, after a predefined number of consecutive failed attempts, the method 400 resets the waiting period (step 409) despite the fact that the destination wasn't reported as available.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for efficient centralized stream initiation and retry control in a computing environment comprising a plurality of host computing devices coupled to a data storage system including one or more storage devices via a network, the method comprising:

scheduling, by a centralized data streams management module in communication with the plurality of host computing devices and the one or more storage devices, transmission of data streams from the plurality of host computing devices to the one or more storage devices in a manner that provides coordination between a plurality of threads in each host computing device and eliminates each data stream from being independent of one another by:

receiving, from the plurality of threads, a notification that a plurality of data streams are being sent from a host computing device to a storage device, wherein each thread is associated with a respective data stream, determining first when each data stream within the plurality of data streams should be opened and sent from the host computing device to the storage device based on whether a previously opened and sent data stream was rejected by the storage device; wherein the previously opened and sent data stream comprises a continuous stream of Input/Output (I/O) data and the storage device comprises a mass storage device having multiple storage drives controlled by a storage controller in the computing environment, transmitting to each thread when a data stream associated with each respective thread should be opened and sent by transmitting:

a notification that each thread is clear to open and send its respective data stream when its respective previously opened and sent data stream was not rejected by the storage device, and a notification that each thread needs to wait to open and send its respective data stream when its respective previously opened and sent data stream was rejected by the storage device, and if the respective previously opened and sent data stream was rejected by the storage device, determining second when to reattempt opening each remaining data stream sent from the host computing device to the storage device storage device after an nth number of consecutive failed attempts using an incrementing time calculation, wherein the incrementing time calculation computes a dynamically calculated time period, receiving a notification that a next previously opened and sent data stream was not rejected by the storage device after the reattempt, and transmitting to a thread being in a sleep mode and associated with a next-scheduled data stream that it is clear to open and send the next-scheduled data stream; wherein the thread associated with the next-scheduled data stream is selected from a queue; and performing up to an nth number of attempts for determining the availability of the storage device for opening the new data stream; wherein the nth number of attempts is reset after reaching a maximum dynamically calculated time period.

2. The method of claim 1, further including, upon the centralized data streams management module receiving a notification the storage device is available, triggering the initiation of a waiting thread to initiate the new data stream to be sent from the host computing device to the storage device.

3. The method of claim 2, further including, upon the centralized data streams management module receiving a notification the storage device is unavailable and cannot receive the new data stream, waiting the dynamically calculated time period prior to performing the nth number of attempts for determining the availability of the storage device for opening the new data stream.

4. The method of claim 3, further including progressively incrementing the dynamically calculated time period.

5. The method of claim 4, further including, following each of the nth number of consecutive failed attempts of determining the availability of the storage device for opening the new data stream, performing one of:

progressively incrementing the dynamically calculated time period according to the incrementing time calculation prior to performing a next consecutive one of the nth number of attempts of determining the availability of the storage device for opening the new data stream after waiting the dynamically calculated time period, and progressively incrementing the dynamically calculated time period according to the incrementing time calculation up to a maximum dynamically calculated time period of determining the availability of the storage device for opening the new data stream after waiting the dynamically calculated time period.

6. The method of claim 5, further including randomly selecting the dynamically calculated time period to be a time interval from a predefined range of time intervals.

7. The method of claim 6, further including performing at least one of:

consulting with the centralized data streams management module for opening the new data stream by the thread, signaling to the thread by the centralized data streams management module to exit the sleep mode and open the new stream, waiting the dynamically calculated time period by the centralized data streams management module until the thread reports to the centralized data streams management module the storage device is one of available and busy, and performing the sleep mode operation on the thread until one of:

issuing a notification by the centralized data streams management module to the thread to exit the sleep mode, and waiting a predetermined sleep time by the thread if the centralized data streams management module is one of not waiting the dynamically calculated time period and not waiting for the thread to receive a status of the storage device.

8. The method of claim 7, further including performing the incrementing time calculation according to:

waiting the dynamically calculated time period upon the first failed attempt of determining the availability of the storage device for opening the new data stream, and progressively incrementing the dynamically calculated time period according to the incrementing time calculation for each consecutive one of the nth number of consecutive failed attempts of determining the availability of the storage device for opening the new data stream after waiting the dynamically calculated time period.

9. A system for efficient centralized stream initiation and retry control in a computing environment including a plurality of host computing devices coupled to a data storage system including one or more storage devices via a network, the system comprising:

a centralized data stream module configured for transmission of data streams from the plurality of host computing devices to the one or more storage devices in a manner that provides coordination between a plurality of threads in each host computing device and eliminates each data stream from being independent of one another; and at least one processor device operable in the computing storage environment and in communication with the centralized data stream module, wherein the at least one processor device is configured for using the centralized data streams management module for:

receiving, from the plurality of threads, a notification that a plurality of data streams are being sent from a host computing device to a storage device, wherein each thread is associated with a respective data stream, determining first when each data stream within the plurality of data streams should be opened and sent from the host computing device to the storage device based on whether a previously opened and sent data stream was rejected by the storage device; wherein the previously opened and sent data stream comprises a continuous stream of Input/Output (I/O) data and the storage device comprises a mass storage device having multiple storage drives controlled by a storage controller in the computing environment, transmitting to each thread when a data stream associated with each respective thread should be opened and sent by transmitting:

a notification that each thread is clear to open and send its respective data stream when its respective previously opened and sent data stream was not rejected by the storage device, and a notification that each thread needs to wait to open and send its respective data stream when its respective previously opened and sent data stream was rejected by the storage device, and if the respective previously opened and sent data stream was rejected by the storage device, determining second when to reattempt opening each remaining data stream sent from the host computing device to the storage device after a nth number of consecutive failed attempts using an incrementing time calculation, wherein the incrementing time calculation computes a dynamically calculated time period, receiving a notification that a next previously opened and sent data stream was not rejected by the storage device after the reattempt, and transmitting to a thread being in a sleep mode and associated with a next-scheduled data stream that it is clear to open and send the next-scheduled data stream; wherein the thread associated with the next-scheduled data stream is selected from a queue; and performing up to an nth number of attempts for determining the availability of the storage device for opening the new data stream; wherein the nth number of attempts is reset after reaching a maximum dynamically calculated time period.

10. The system of claim 9, wherein the at least one processor device, upon the centralized data streams management module receiving a notification the storage device is available, triggers the initiation of a waiting thread to initiate the new data stream to be sent from the host computing device to the storage device.

11. The system of claim 10, wherein the at least one processor device, upon the centralized data streams management module receiving a notification the storage device is unavailable and cannot receive the new data stream, waits the dynamically calculated time period prior to performing the nth number of attempts for determining the availability of the storage device for opening the new data stream.

12. The system of claim 11, wherein the at least one processor device progressively increments the dynamically calculated time period.

13. The system of claim 12, wherein the at least one processor device, following each of the nth number of consecutive failed attempts of determining the availability of the storage device for opening the new data stream, performs one of:

progressively incrementing the dynamically calculated time period according to the incrementing time calculation prior to performing a next consecutive one of the nth number of attempts of determining the availability of the storage device for opening the new data stream after waiting the dynamically calculated time period, and progressively incrementing the dynamically calculated time period according to the incrementing time calculation up to a maximum dynamically calculated time period of determining the availability of the storage device for opening the new data stream after waiting the dynamically calculated time period.

14. The system of claim 13, wherein the at least one processor device randomly selects the dynamically calculated time period to be a time interval from a predefined range of time intervals.

15. The system of claim 14, wherein the at least one processor device performs at least one of:

consulting with the centralized data streams management module for opening the new data stream by the thread, signaling to the thread by the centralized data streams management module to exit the sleep mode and open the new stream, waiting the dynamically calculated time period by the centralized data streams management module until the thread reports to the centralized data streams management module the storage device is one of available and busy, and performing the sleep mode operation on the thread until one of:

issuing a notification by the centralized data streams management module to the thread to exit the sleep mode, and waiting a predetermined sleep time by the thread if the centralized data streams management module is one of not waiting the dynamically calculated time period and not waiting for the thread to receive a status of the storage device.

16. The system of claim 15, wherein the at least one processor device performs incrementing time calculation according to:

waiting the dynamically calculated time period upon the first failed attempt of determining the availability of the storage device for opening the new data stream, and progressively incrementing the dynamically calculated time period according to the incrementing time calculation for each consecutive one of the nth number of consecutive failed attempts of determining the availability of the storage device for opening the new data stream after waiting the dynamically calculated time period.

17. A computer program product for efficient centralized stream initiation and retry control in a computing environment comprising a plurality of host computing devices coupled to a data storage system including one or more storage devices via a network, by a processor device, the computer program product comprising a non-transitory computer-readable memory including computer-readable program code portions stored therein, the computer-readable program code portions comprising:

computer code for scheduling, by a centralized data streams management module in communication with the plurality host computing devices and the one or more storage devices, transmission of data streams from the plurality of host computing devices to the one or more storage devices in a manner that provides coordination between a plurality of threads in each host computing device and eliminates each data stream from being independent of one another by:

computer code for receiving, by the centralized data streams management module from the plurality of threads, a notification that a plurality of data streams are being sent from a host computing device to a storage device, wherein each thread is associated with a respective data stream, computer code for determining first when each data stream within the plurality of data streams should be opened and sent from the host computing device to the storage device based on whether a previously opened and sent data stream was rejected by the storage device; wherein the previously opened and sent data stream comprises a continuous stream of Input/Output (I/O) data and the storage device comprises a mass storage device having multiple storage drives controlled by a storage controller in the computing environment, computer code for transmitting to each thread when a data stream associated with each respective thread should be opened and sent by transmitting:
- a notification that each thread is clear to open and send its respective data stream when its respective previously opened and sent data stream was not rejected by the storage device, and
- a notification that each thread needs to wait to open and send its respective data stream when its respective previously opened and sent data stream was rejected by the storage device, and if the respective previously opened and sent data stream was rejected by the storage device, computer code for determining second when to reattempt opening each remaining data stream sent from the host computing device to the storage device after an nth number of consecutive failed attempts using an incrementing time calculation, wherein the incrementing time calculation computes a dynamically calculated time period, computer code for receiving a notification that a next previously opened and sent data stream was not rejected by the storage device after the reattempt, and computer code for transmitting to a thread being in a sleep mode and associated with a next-scheduled data stream that it is clear to open and send the next-scheduled data stream; wherein the thread associated with the next-scheduled data stream is selected from a queue; and computer code for performing up to an nth number of attempts for determining the availability of the storage device for opening the new data stream; wherein the nth number of attempts is reset after reaching a maximum dynamically calculated time period.

18. The computer program product of claim 17, further comprising computer code for, upon the centralized data streams management module, receiving a notification the storage device is available, triggers the initiation of a waiting thread to initiate the new data stream to be sent from the host computing device to the storage device.

19. The computer program product of claim 18, further comprising computer code for, upon the centralized data streams management module, receiving a notification the storage device is unavailable and cannot receive the new data stream, waits the dynamically calculated time period prior to performing the nth number of attempts for determining the availability of the storage device for opening the new data stream.

20. The computer program product of claim 19, further comprising computer code for progressively incrementing the predetermined time by one of a power of two and an exponential calculation.

21. The computer program product of claim 20, further comprising computer code for, following each of the nth number of consecutive failed attempts of determining the availability of the storage device for opening the new data stream, performing one of:
- progressively incrementing the dynamically calculated time period according to the incrementing time calculation prior to performing a next consecutive one of the nth number of attempts of determining the availability of the storage device for opening the new data stream after waiting the dynamically calculated time period, and
- progressively incrementing the dynamically calculated time period according to the incrementing time calculation up to a maximum dynamically calculated time period of determining the availability of the storage device for opening the new data stream after waiting the dynamically calculated time period.

22. The computer program product of claim 21, further comprising computer code for randomly selecting the dynamically calculated time period to be a time interval from a predefined range of time intervals.

23. The computer program product of claim 22, further comprising computer code for performing at least one of:
- consulting with the centralized data streams management module for opening the new data stream by the thread,
- signaling to the thread by the centralized data streams management module to exit the sleep mode and open the new stream,
- waiting the dynamically calculated time period by the centralized data streams management module until the thread reports to the centralized data streams management module the storage device is one of available and busy, and
- performing the sleep mode operation on the thread until one of:
  - issuing a notification by the centralized data streams management module to the thread to exit the sleep mode, and
- waiting a predetermined sleep time by the thread if the centralized data streams management module is one of not waiting the dynamically calculated time period and not waiting for the thread to receive a status of the storage device.

24. The computer program product of claim 23, further comprising computer code for performing the incrementing time calculation according to:
- waiting the dynamically calculated time period upon the first failed attempt of determining the availability of the storage device for opening the new data stream, and
- progressively incrementing the dynamically calculated time period according to the incrementing time calculation for each consecutive one of the nth number of consecutive failed attempts of determining the availability of the storage device for opening the new data stream after waiting the dynamically calculated time period.

* * * * *